United States Patent
Liu et al.

(10) Patent No.: US 11,263,918 B1
(45) Date of Patent: *Mar. 1, 2022

(54) AUDIO BIBLE PLAYERS WITH A NUMERICAL INDEXING SYSTEM AND A MULTIPLE BIBLE VERSION PLAYBACK FUNCTION

(71) Applicants: Guangtian Liu, Fremont, CA (US); Jinqiang Lai, Fremont, CA (US)

(72) Inventors: Guangtian Liu, Fremont, CA (US); Jinqiang Lai, Fremont, CA (US)

(73) Assignees: Guangtian Liu, Fremont, CA (US); Jinqiang Lai, Fremont, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/878,415

(22) Filed: Jan. 24, 2018

Related U.S. Application Data (63) Continuation of application No. 14/798,472, filed on Jul. 14, 2015, now Pat. No. 9,911,356.

(60) Provisional application No. 62/024,186, filed on Jul. 14, 2014.

(51) Int. Cl.
| | |
|---|---|
| *G09B 19/00* | (2006.01) |
| *G06F 15/02* | (2006.01) |
| *G06F 3/0484* | (2013.01) |
| *G09B 5/04* | (2006.01) |
| *G06F 16/60* | (2019.01) |
| *G06F 3/0483* | (2013.01) |
| *G06F 3/04842* | (2022.01) |

(52) U.S. Cl.
CPC .......... *G09B 19/00* (2013.01); *G06F 3/04842* (2013.01); *G06F 15/025* (2013.01); *G06F 16/60* (2019.01); *G09B 5/04* (2013.01); *G06F 3/0483* (2013.01)

(58) Field of Classification Search
CPC ........... G06F 17/30749; G06F 17/3074; G06F 17/30778; G06F 15/0291
USPC ........................................................ 715/716
See application file for complete search history.

(56) References Cited

U.S. PATENT DOCUMENTS

| | | | | |
|---|---|---|---|---|
| 4,970,680 | A * | 11/1990 | Walters ............... | G06F 15/0283 345/55 |
| 5,256,067 | A * | 10/1993 | Gildea ..................... | G09B 7/02 434/167 |
| 5,871,238 | A * | 2/1999 | Furniss .................. | B42D 15/00 283/67 |
| 6,278,992 | B1 * | 8/2001 | Curtis ................. | G06F 16/2237 707/711 |
| 6,325,284 | B1 * | 12/2001 | Walker ................... | G06Q 30/02 235/380 |
| 7,044,741 | B2 * | 5/2006 | Leem ................ | G06F 17/30749 434/156 |
| 2003/0006969 | A1 * | 1/2003 | Barras ...................... | G09B 5/02 345/169 |

(Continued)

*Primary Examiner* — Sheree N Brown
(74) *Attorney, Agent, or Firm* — George Guosheng Wang; United States Research and Patent Firm (57) ABSTRACT

Audio bible players with a 6-digit numerical indexing system to the chapter level or a 9-digit numerical indexing system to the verse level are disclosed. Users can not only find a particular chapter or verse of the bible quickly, but also can switch to the same chapter or verse of a different translation easily for comparison study. They are easy and convenient to use, and are great tools for bible study, bible memorization, language study, and sharing bible with people in other languages, etc.

14 Claims, 9 Drawing Sheets

Heavenly Brothers One Year Bible Plan

One Year Bible Schedule

January

| | | | | |
|---|---|---|---|---|
| 1/1 | Gen1 | Gen2 | Matt1 | Ps1 |
| 1/2 | Gen3 | Gen4 | Matt2 | Ps2 |
| 1/3 | Gen5 | Gen6 | Matt3 | Ps3 |
| 1/4 | Gen7 | Gen8 | Matt4 | Ps4 |
| 1/5 | Gen9 | Gen10 | Matt5 | Ps5 |
| 1/6 | Gen11 | Gen12 | Matt6 | Ps6 |
| 1/7 | Gen13 | Gen14 | Matt7 | Ps7 |
| 1/8 | Gen15 | Gen16 | Matt8 | Ps8 |
| 1/9 | Gen17 | Gen18 | Matt9 | Ps9 |
| 1/10 | Gen19 | Gen20 | Matt10 | Ps10 |
| 1/11 | Gen21 | Gen22 | Matt11 | Ps11 |
| 1/12 | Gen23 | Gen24 | Matt12 | Ps12 |
| 1/13 | Gen25 | Gen26 | Matt13 | Ps13 |
| 1/14 | Gen27 | Gen28 | Matt14 | Ps14 |
| 1/15 | Gen29 | Gen30 | Matt15 | Ps15 |
| 1/16 | Gen31 | Gen32 | Matt16 | Ps16 |
| 1/17 | Gen33 | Gen34 | Matt17 | Ps17 |
| 1/18 | Gen35 | Gen36 | Matt18 | Ps18 |
| 1/19 | Gen37 | Gen38 | Matt19 | Ps19 |
| 1/20 | Gen39 | Gen40 | Matt20 | Ps20 |

(56) References Cited

U.S. PATENT DOCUMENTS

| | | | | |
|---|---|---|---|---|
| 2004/0044473 | A1* | 3/2004 | Leem | G06F 17/30749 |
| | | | | 434/156 |
| 2005/0243658 | A1* | 11/2005 | Mack | G04G 9/0064 |
| | | | | 368/223 |
| 2006/0069456 | A1* | 3/2006 | Stringer | G11B 33/025 |
| | | | | 700/94 |
| 2006/0123352 | A1* | 6/2006 | McClinton | G06F 1/1656 |
| | | | | 715/776 |
| 2007/0042332 | A1* | 2/2007 | Leem | G06F 17/30743 |
| | | | | 434/156 |
| 2007/0166678 | A1* | 7/2007 | Browning | G09B 5/04 |
| | | | | 434/245 |
| 2007/0282786 | A1* | 12/2007 | Block | G06F 16/40 |
| 2009/0240671 | A1* | 9/2009 | Torres | G06F 16/93 |
| 2010/0083162 | A1* | 4/2010 | Hernandez | G06F 1/1647 |
| | | | | 715/776 |
| 2010/0293498 | A1* | 11/2010 | Maxfield | G06F 3/0219 |
| | | | | 715/776 |
| 2012/0178066 | A1* | 7/2012 | Drum | G09B 5/04 |
| | | | | 434/245 |

* cited by examiner

Heavenly Brothers One Year Bible Plan

One Year Bible Schedule

January

| | | | | |
|---|---|---|---|---|
| 1/1  | Gen1  | Gen2  | Matt1  | Ps1  |
| 1/2  | Gen3  | Gen4  | Matt2  | Ps2  |
| 1/3  | Gen5  | Gen6  | Matt3  | Ps3  |
| 1/4  | Gen7  | Gen8  | Matt4  | Ps4  |
| 1/5  | Gen9  | Gen10 | Matt5  | Ps5  |
| 1/6  | Gen11 | Gen12 | Matt6  | Ps6  |
| 1/7  | Gen13 | Gen14 | Matt7  | Ps7  |
| 1/8  | Gen15 | Gen16 | Matt8  | Ps8  |
| 1/9  | Gen17 | Gen18 | Matt9  | Ps9  |
| 1/10 | Gen19 | Gen20 | Matt10 | Ps10 |
| 1/11 | Gen21 | Gen22 | Matt11 | Ps11 |
| 1/12 | Gen23 | Gen24 | Matt12 | Ps12 |
| 1/13 | Gen25 | Gen26 | Matt13 | Ps13 |
| 1/14 | Gen27 | Gen28 | Matt14 | Ps14 |
| 1/15 | Gen29 | Gen30 | Matt15 | Ps15 |
| 1/16 | Gen31 | Gen32 | Matt16 | Ps16 |
| 1/17 | Gen33 | Gen34 | Matt17 | Ps17 |
| 1/18 | Gen35 | Gen36 | Matt18 | Ps18 |
| 1/19 | Gen37 | Gen38 | Matt19 | Ps19 |
| 1/20 | Gen39 | Gen40 | Matt20 | Ps20 |

| No. | Book | No. | Book | No. | Book | No. | Book |
|---|---|---|---|---|---|---|---|
| 1 | Genesis | 11 | 1 King | 21 | Ecclesiastes | 31 | Obadiah |
| 2 | Exodus | 12 | 2 King | 22 | Song of Solomon | 32 | Jonah |
| 3 | Leviticus | 13 | 1 Chronicles | 23 | Isaiah | 33 | Micah |
| 4 | Numbers | 14 | 2 Chronicles | 24 | Jeremiah | 34 | Nahum |
| 5 | Deuteronomy | 15 | Ezra | 25 | Lamentation | 35 | Habakkuk |
| 6 | Joshua | 16 | Nehemiah | 26 | Ezekiel | 36 | Zephaniah |
| 7 | Judges | 17 | Esther | 27 | Daniel | 37 | Haggai |
| 8 | Ruth | 18 | Job | 28 | Hosea | 38 | Zechariah |
| 9 | 1 Samuel | 19 | Psalms | 29 | Joel | 39 | Malachi |
| 10 | 2 Samuel | 20 | Proverbs | 30 | Amos | | |

Fig.4

| No. | Book | No. | Book | No. | Book |
|---|---|---|---|---|---|
| 1 | Matthew | 11 | Philippians | 21 | 1 Peter |
| 2 | Mark | 12 | Colossians | 22 | 2 Peter |
| 3 | Luke | 13 | 1 Thessalonians | 23 | 1 John |
| 4 | John | 14 | 2 Thessalonians | 24 | 2 John |
| 5 | Acts | 15 | 1 Timothy | 25 | 3 John |
| 6 | Romans | 16 | 2 Timothy | 26 | Jude |
| 7 | 1 Corinthians | 17 | Titus | 27 | Revelation |
| 8 | 2 Corinthians | 18 | Philemon | | |
| 9 | Galatians | 19 | Hebrew | | |
| 10 | Ephesians | 20 | James | | |

AUDIO BIBLE PLAYERS WITH A NUMERICAL INDEXING SYSTEM AND A MULTIPLE BIBLE VERSION PLAYBACK FUNCTION

CROSS-REFERENCE TO RELATED APPLICATIONS

This application claims the benefit of provisional patent application Ser. No. 62/024,186, filed on Jul. 14, 2014 by the present inventors.

BACKGROUND—PRIOR ART

The following is a tabulation of some prior art that presently appears relevant:

U.S. Pats.

| Pat. No. | Issue Date | Patentee |
| --- | --- | --- |
| 4,445,196 | Apr. 24, 1984 | Gonet |
| 4,970,680 | Nov. 13, 1990 | Walters |
| 5,987,451 | Nov. 16, 1999 | Oehm |

U.S. Pat. Application Publications

| Publication Number | Publication Date | Applicant |
| --- | --- | --- |
| 20090240671 A1 | Sep. 24, 2009 | Torres |
| 20100083162 A1 | Apr. 1, 2010 | Hernandez |
| 20030006969 A1 | Jan. 9, 2003 | Barras |
| 20070282786 A1 | Dec. 6, 2007 | Block |
| 20060069456 A1 | Mar. 30, 2006 | Stringer |

NONPATENT COMMERCIAL PRODUCT REFERENCE

1. Franklin Electronics BIB-950 Speaking Parallel KJV/NLT Life Application Study Bible Electronic Reference Device (Amazon.com product number: B008EH7M84)
2. GoBible Original—King James Version (2011) (Amazon.com product number: B001BKV06G)
3. Holy Bible—Hendrickson My Ibible: King James Version, Voice Only Preloaded Digital Audio Player (Amazon.com ISBN-10: 1619706687)
4. Chinese Bible Portable Electronics Audio Player MP3 Mandarin Chinese Christian (Amazon.com product number: B00W8ULNOC)

Audio bibles have become more and more popular recently, with more than 20 dramatized and non-dramatized versions available for English translations alone. There are several advantages for listening to audio bibles:

1. There are many bible texts that are very difficult to read and pronounce, including many foreign people names and place names. A reader can easily overcome this by listening to audio bibles, and he/she can understand the bible content much better when both reading and listening to the bible. In addition, dramatized bible can make bible stories much more visualized than plain text bible.
2. Audio bibles are particularly useful for those whose preferred learning style is listening instead of reading, who have eyesight problems or reading difficulties.
3. While many Christians today are suffering busy daily schedules and do not have enough time to read bible, they can easily find time to listen to audio bible when driving, cooking, and exercising, etc.
4. It is also found recently that audio bibles are good English language learning tools for children. While it is difficult for a child at the age of 6 to read a chapter of English bible, it is much easier for the child to listen to the same chapter. After listening to the same chapter several times and becoming familiar with the contents/words, the child can read and understand the corresponding text much easier. Since children love to listen to stories, they enjoy listening to dramatized audio bibles. Because bible has large vocabularies, children can learn the English language quickly while learning to the bible.
5. Audio bibles are also great tools to assist bible memorization. If one listens to a passage again and again, it becomes easier to memorize it.

Figure 1:
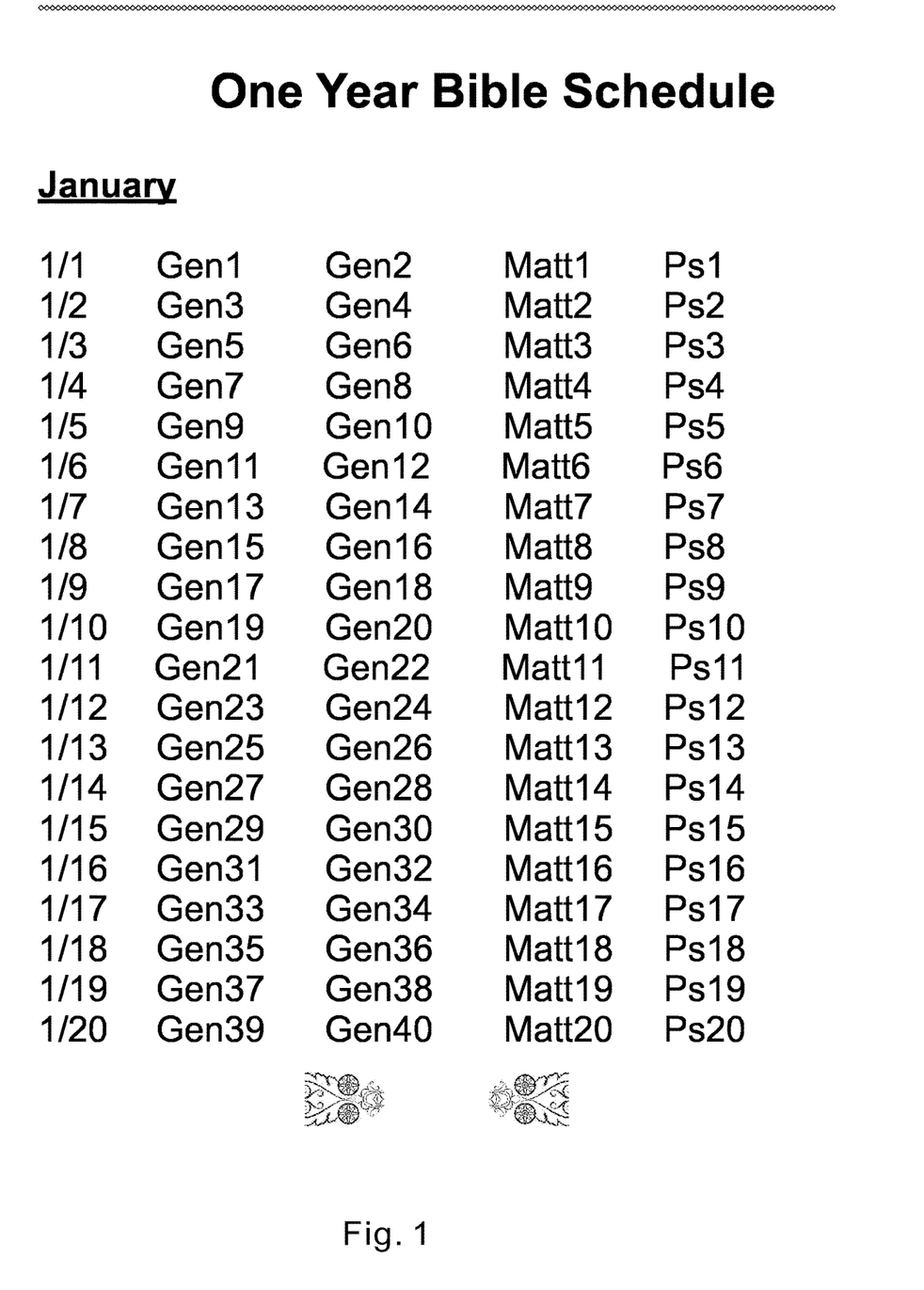
FIG. 1: A one-year bible reading plan example

While CD players, mp3 players, smart phones/tablets can be used to play audio bibles, there are several disadvantages:

1. If you only have one CD player, e.g. in your living room, you can only listen to audio bibles at where it is located. You also need to change disks frequently in order to listen to different books. If you have two CD players, e.g. one in your living room and another one in your car, you have to carry CDs around in order to play at both places, which is very inconvenient.
2. While mp3 players, smart phones/tablets are more convenient to play than CD players, their indexing system is not that convenient. They usually index by artist names, or album names, making it difficult to find a chapter of the bible because the whole Christian bible has 66 books and 1189 chapters. Even if you put all the chapters of one book into one album, you still need to go through a 66 book album menu first and then search for chapters. For a Psalm album, there are as many as 150 chapters to choose from. It can also make your mp3 player very crowded and difficult to find other contents.
3. In order to play on mp3 players, smart phones/phones, you may also need to go through the hassle to set up each audio bible file properties correctly in order that they may go into the right albums. It is not easy to do this right with 1189 audio bible files. That's why there are still some people who prefer to use CD players.
4. It is common for Christians who follow one-year bible reading plans to read different chapters from different books each day, e.g. two Old Testament history book chapters, one Psalm or Proverb chapter, and one New Testament chapter (See FIG. 1 for a bible reading plan example). The mp3 player, smart phone/tablet indexing system makes it difficult to jump to different chapters of different books back and forth.
5. Another major disadvantage of smart phones/tablets is temptation and distraction. While smart phones/tablets are becoming more and more powerful today, it is also very easy to waste time on emails, social media, and games, etc. That's why the average US smart phone users are spending 2-3 hours a day on their phones. As a result, it is very difficult to have a quality/focused time to study/listen to the bible on smart phones. If you give a child a smart phone to listen to audio bible, it is most likely that he/she will be tempted to play games, etc.
6. Smartphones and tablets are usually expensive and not affordable to some people. Even some good mp3 players like iPod are very expensive.

Due to these disadvantages, it is necessary to have a dedicated audio player to play audio bibles:

In order to better study bible and get accurate meanings of particular verses, parallel text bibles are commonly used, in which two or more English bible translations are printed side by side for comparison study. If an audio bible player can play two or more English translations, it will be an even more valuable tool for bible study.

Since US is a country with immigrants from all over the world, there are many bilingual Christians/Churches, e.g. English/Spanish, English/Chinese, etc. Bilingual parallel text bibles are also commonly used. When the same bible text in two different languages is compared side by side, it is much easier to understand the actual meaning. It is also used as an effective tool to learn another language. If you understand the bible text well in one language, it is much easier for you to understand the same text in another language. As of 2005, there are audio bible recordings in almost 1000 languages. If there are bilingual or multi-lingual audio bible players available, they can be great tools to learn the bible, to learn different languages, and to share bible with people in other languages all over the world.

As almost all audio bible recordings are done on a chapter basis, most audio bible players are indexed to the chapter level only. But there are significant advantages if a player can index to the verse level.

1. Most of the bible quotations in preaching and books are at the verse level, e.g. John 3:16. If an audio bible player can go to a particular verse easily, it is even more convenient to use.
2. For parallel audio bible players, whether loaded with different English translations or different language translations, if one not only can find a particular verse quickly, but also can switch to the same verse of another translation quickly, one can easily compare the same verse in different translations. It will be a much more useful tool to study bible and another language.
3. In term of bible memorization, this is also very important. If one player can repeat a verse, instead of a chapter, again and again, the listener can easily divide the big task of memorizing a whole chapter into smaller tasks of memorizing verse by verse. This will become a powerful tool for children who participate in US national bible memorization competitions like Bible Bcc or Bible Bowl.

Figure 2:
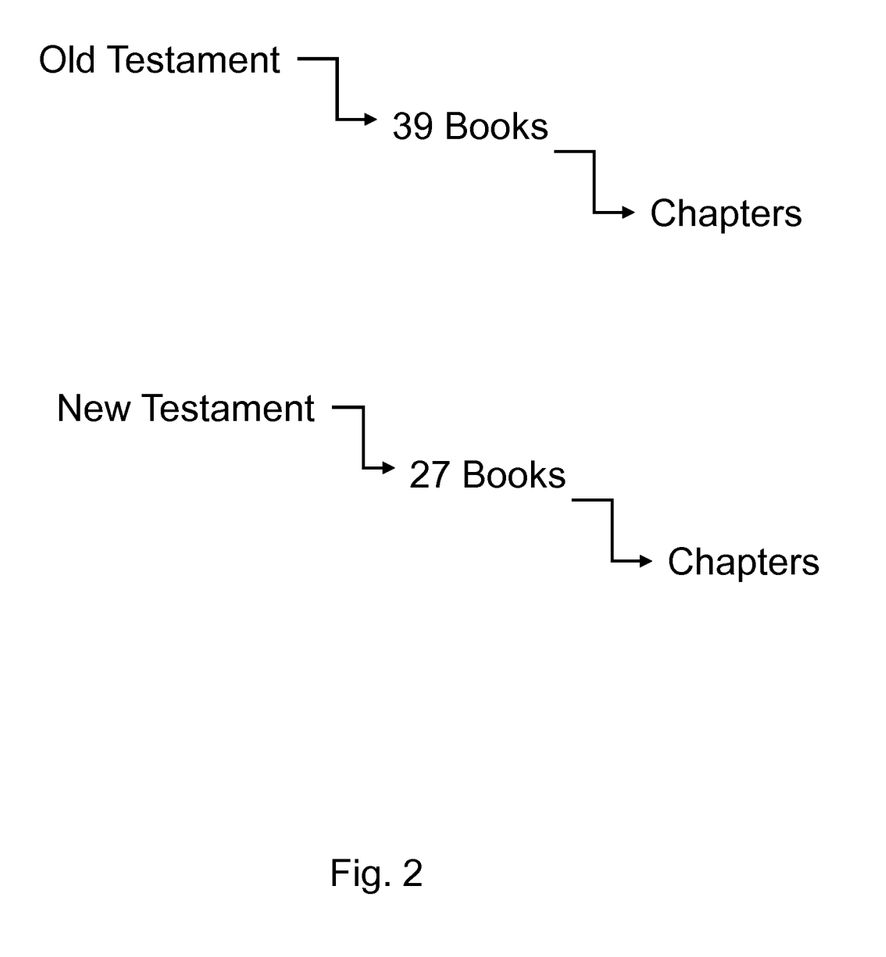
FIG. 2: A traditional audio bible indexing system down to the chapter level

Because of the advantages of a dedicated audio bible player, there are several different audio bible players available in the market, e.g. GoBible Original (by GoBible LLC, Amazon.com product number: ASIN B001BKV06G US patent application publication 20070282786 A1), My-ibible (by Hendrickson Publisher, Amazon.com product number: ISBN-10: 1619706687), Franklin Speaking Bible (by Franklin Electronics, Amazon.com product number: ASIN B008EH7M84), etc. While they eliminate the hassle of loading mp3 files correctly by the user, and temptations and distractions of smart phone/tablets, there is no actual improvement of their indexing systems. FIG. 2 is an example of the indexing system. One still needs to spend time go through the menu/sub-menu to find a particular chapter of the bible out of a total of 66 books and 1189 chapters. It is also very inconvenient to jump to different books/chapters back and forth in order to follow a one year bible reading plan. US patent application publication (20060069456 A1) also used the same indexing system with no improvement. A Chinese audio bible player (Amazon-.com product number: B00W8ULNOC) uses a 4-digit numerical indexing system, in which the first chapter of the bible, Genesis 1, is given the number of 0001, and the last chapter of the bible, Revelation 22 is given the number of 1189. All other 1187 chapters use numbers in between based on their natural order in the whole bible. Even though a user can get around the traditional indexing menu to access any chapter of the bible quickly by entering a 4-digit number, it is almost impossible to remember all the 4-digit index numbers, and one has to refer to a printed menu for a chapter index number all the time, which is very inconvenient.

Besides audio bible players, there are also electronic bibles available for displaying bible text only. In theory, they could use the same indexing system as an audio bible player, except that they will display bible texts. While there were several attempts in US patents and US patent application publications to improve the indexing system of electronic bible, none of them are that successful. In U.S. Pat. No. 5,987,451 (1999), and US patent application publication 20090240671 A1, 20100083162 A1, 20030006969 A1, 66 buttons are used for 66 bible books, which is too complicated to implement and use. U.S. Pat. No. 4,970,680 (1999) proposed a computerized bible with full keyboard, which is also complicated with no actual indexing improvement. U.S. Pat. No. 4,445,196 (1984) proposed a numerical system in which each of the 66 books would be assigned a book number based on the book name alphabetical order. Because it is difficult to remember, it has not been implemented on any real products. As a result, most of the audio bible players and electronic bibles today are still use the traditional indexing system as illustrated in FIG. 2, which is inconvenient to use. Despite the advantages of parallel audio bible players for different English translations or different language translations listed above, only the Hendrickson speaking bible can play two different English translations. But due to its inconvenient indexing system and its high cost/price, it has not been successful and is no long manufactured.

Figure 3:
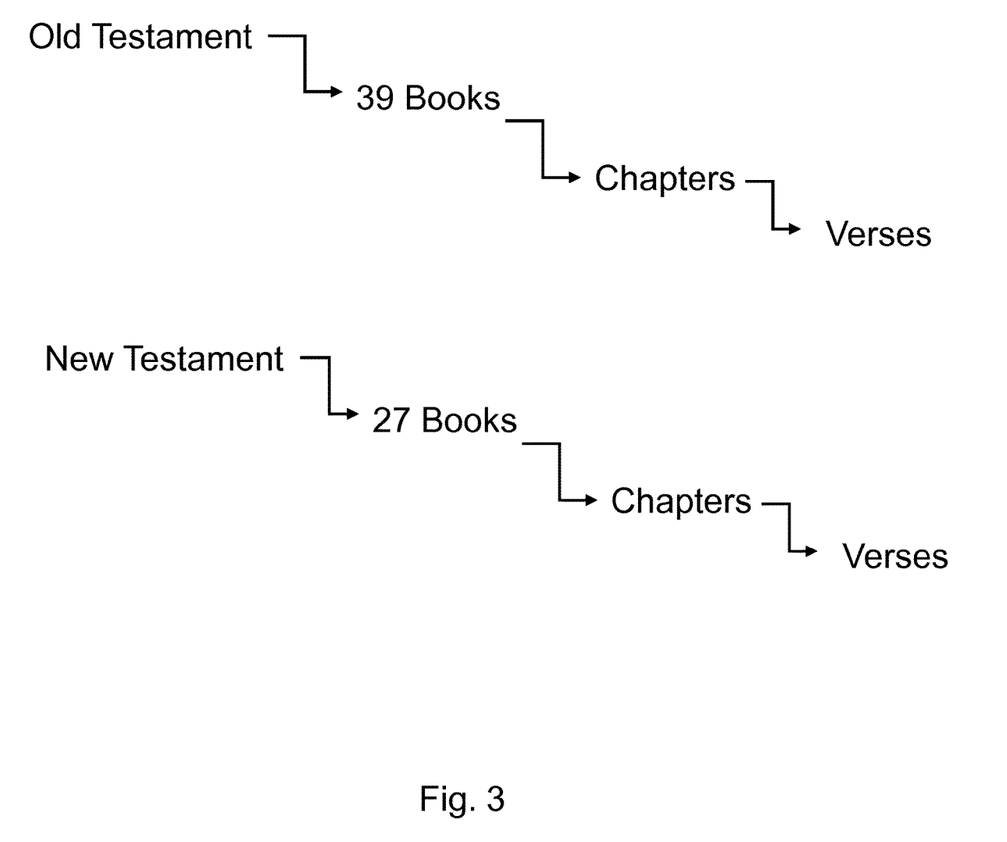
FIG. 3: A traditional audio bible indexing system down to the verse level.

Despite the advantages promised by indexing to verse level, only the Gobible Original can index to verse level. However, it didn't make any fundamental improvement to the indexing system other than adding one more sub menu for verses as illustrated in FIG. 3. As a result, it is still difficult to use. Also, it didn't claim other benefits of being able to index to verse level as it couldn't play more than one translation on the same player.

SUMMARY OF THE INVENTION

An audio bible player with a 6-digit numerical indexing system that can reach any chapter of the bible quickly and switch to the same chapter of different translations easily.

An audio bible player with a 9-digit numerical indexing system that can reach any verse of the bible quickly and switch to the same verse of different translations easily.

Advantages

1. The numerical indexes are based on natural book orders and natural chapter numbers in the bible, which are very easy to remember and play. One can go to any chapter or any verse of the bible very fast. One can also go the same chapter or verse of different translations easily. The numerical indexes also help users to remember the whole bible structure, which is very important to understand the content and context of each book.
2. They are simple to make, with much lower costs than smart phones/tablets.

3. They are great tools for bible study, language study, bible memorization and sharing bible in another language.
4. Since Arabic numerals are understandable in almost any languages, audio bible players with numerical index can be used in any languages without the need of customizing the menu to the specific language.

DRAWINGS—REFERENCE NUMERALS

11: Audio Bible Player
12: Input means
13: Controller
14: Output means
15: Memory
21: Display
22: Power on/off Switch
23: Volume Down
24: Volume Up
25: Bible Version Change Key
26: Next Bible Book
27: Earphone Hole
28: Previous bible book
29: USB port
30: Last Chapter or Fast Backward within the same chapter
31: Memory Card
32: Next Chapter or Fast Forward within the same chapter
33: Play/Pause
34: Backspace
35: Repeat
36: Built-in Speaker

DETAILED DESCRIPTIONS

First Embodiment

Figure 4:
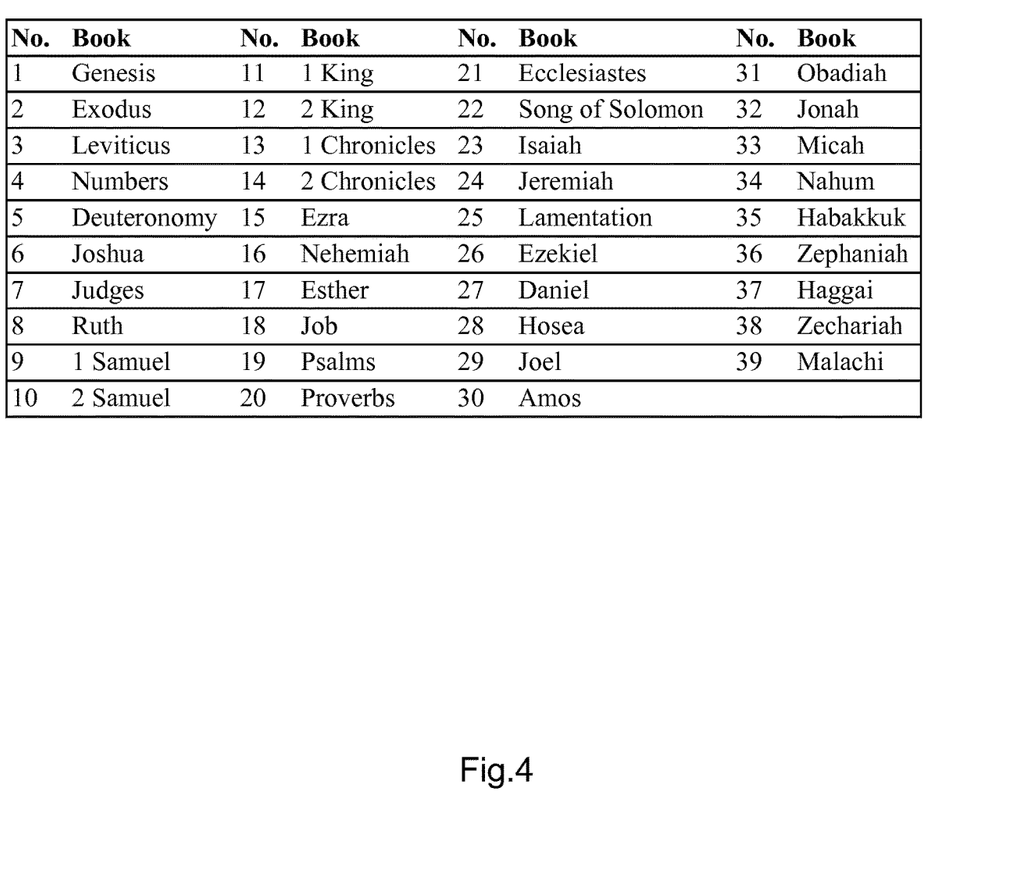
FIG. 4: An illustration of Old Testament Numerical book index
Figure 5:
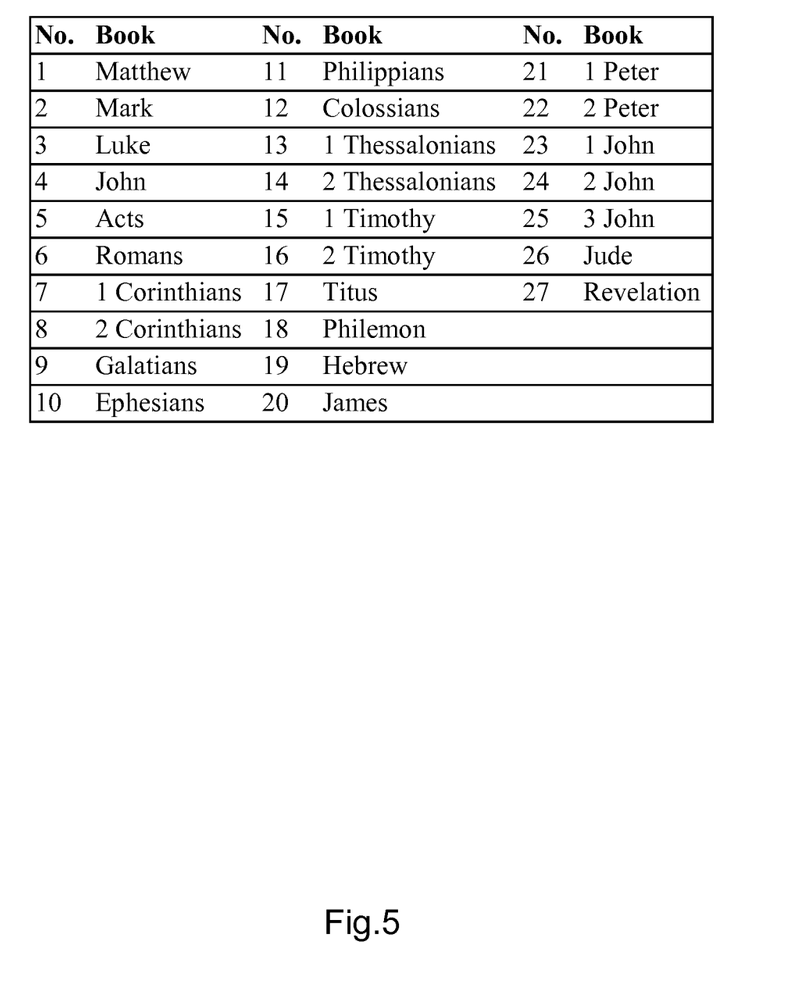
FIG. 5: An illustration of New Testament Numerical book index

In this audio bible player, a 6-digit numerical indexing system is used:

Each bible chapter is represented by a six digit number, a-bb-ccc a=1 represents Old Testament. a=2 represents New Testament bb is the book number in Old Testament (See FIG. 4) or New Testament (See FIG. 5) based on the natural bible book orders.

ccc is the chapter number, e.g. chapter 5 is represented by 005 and chapter 12 is represented by 012. All the zeros are necessary in order to make up a 3-digit number.

As an example, we want to find the gospel of John chapter 3:

Because the gospel of John is in the New Testament, a=2

Because the gospel of John is the 4th book in the New Testament, bb=04

For chapter 3, ccc=003.

So, the 6-digit index for the gospel of John chapter 3 is 2-04-003

Figure 6:
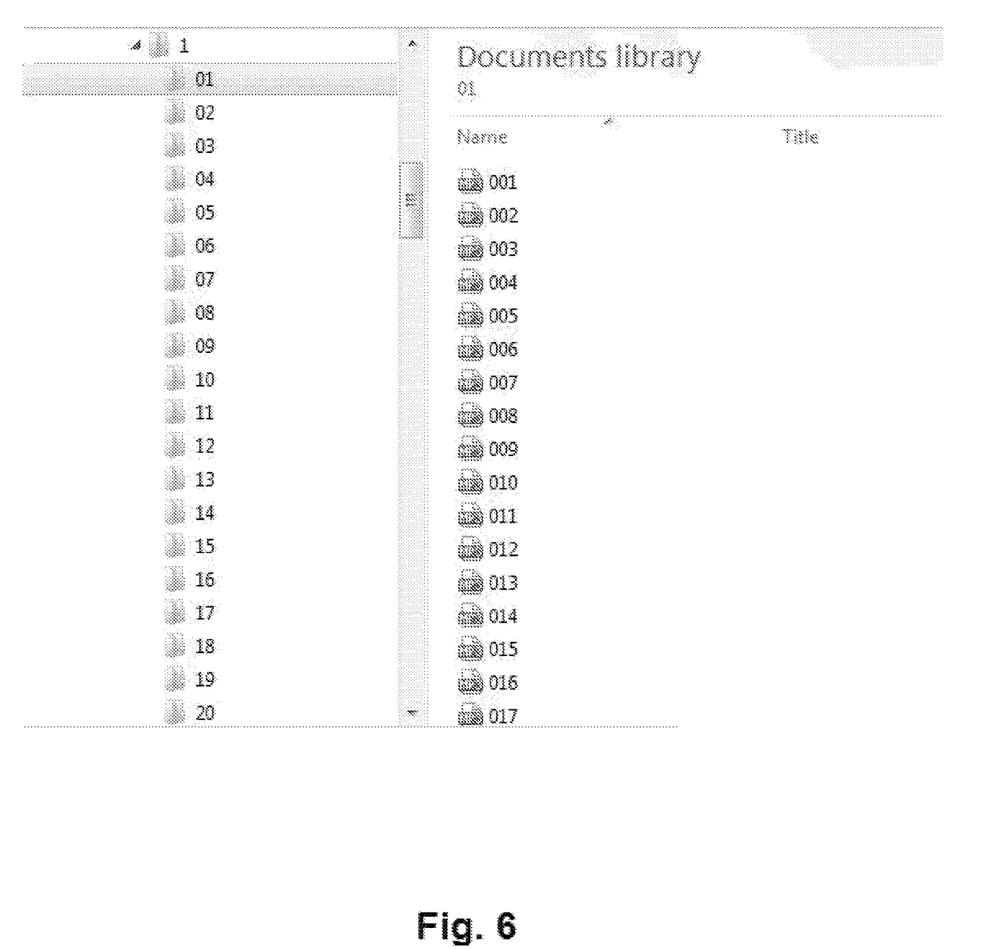
FIG. 6: An illustration of one file system embodiment for the 6-digit indexing system

Since there are only 66 book numbers, it won't be difficult to remember. At the beginning, a user can always refer to book numbers listed in a user manual. As he/she uses it more, he/she will be able to remember more and more book numbers naturally. There is also an additional benefit for remembering the book numbers: Since the book numbers correspond to the natural bible book order, the user will also be able to remember the whole structure of the bible, which is very important for bible study. FIG. 6 is an embodiment of how different chapters of audio bible files are stored in the audio bible player memory for easy indexing access. In the root directory, there are two folders: "1" is for Old Testament and "2" is for New Testament. Since there are 39 books in the Old Testament, there would be 39 subfolders under the Old Testament folder "1", with the subfolder names correspond to the book numbers. Under each subfolder, each chapter of this book is stored in one audio file with file names correspond to the 3-digit chapter numbers.

Figure 7:
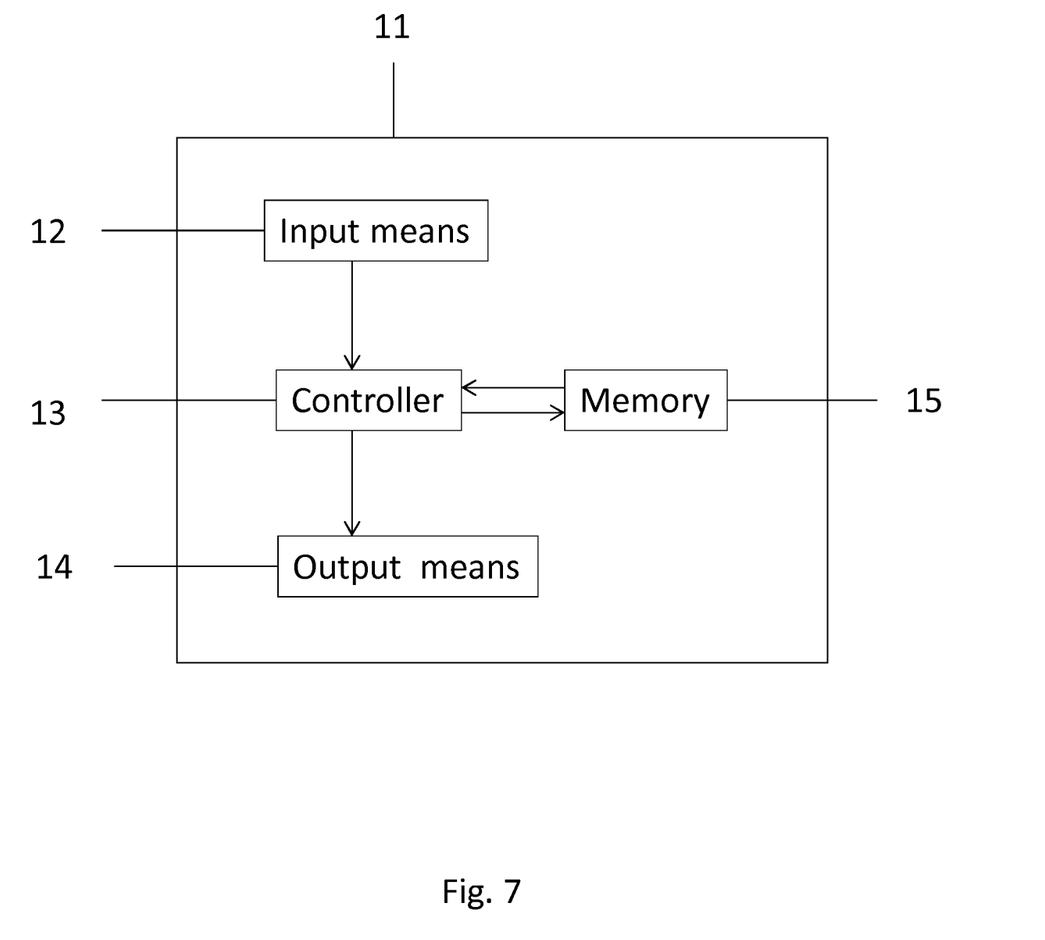
FIG. 7: A flow chart showing how the audio bible player works
Figure 8:
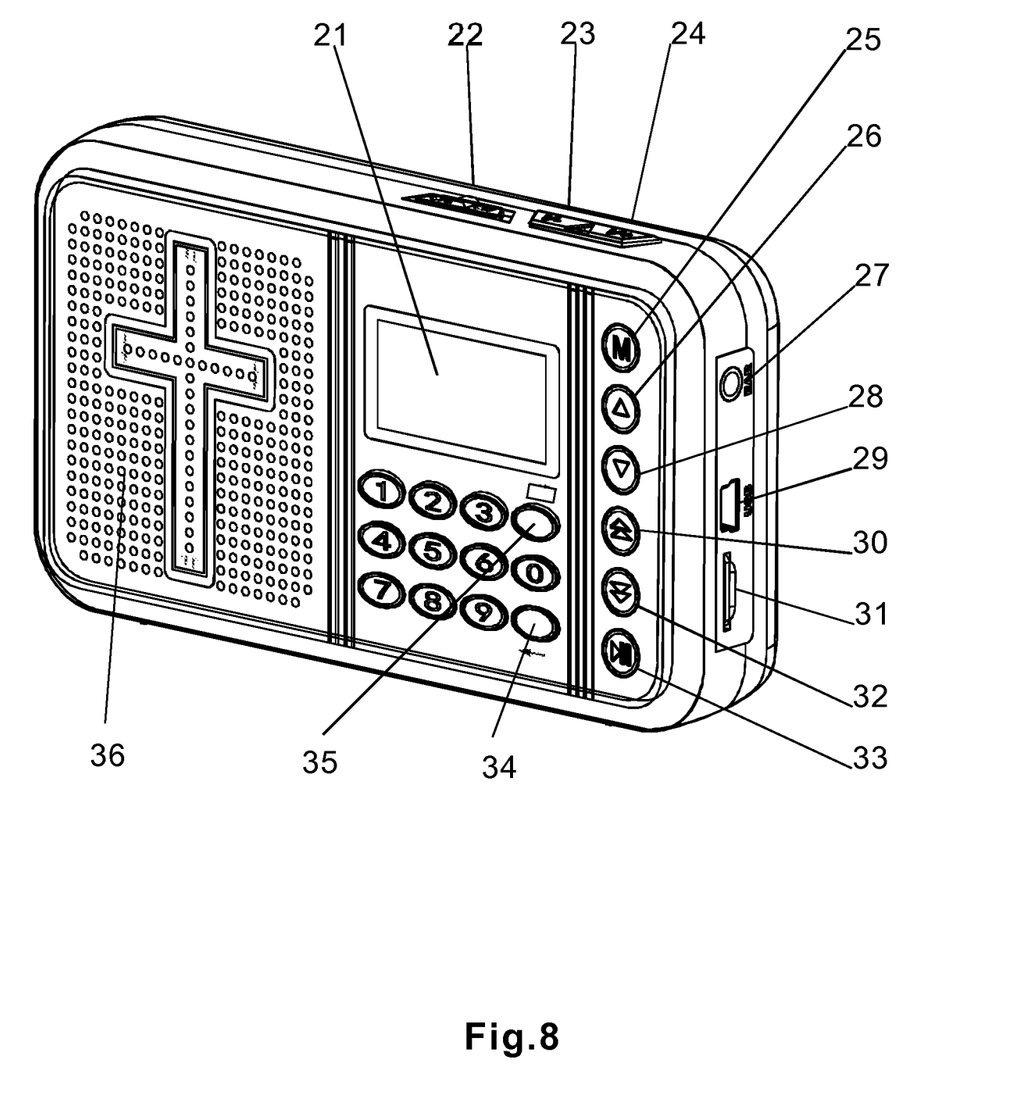
FIG. 8: An oblique view of an audio bible player embodiment

FIG. 7 is a flow chart showing how the audio bible player works

Operation

A user enters a six-digit bible chapter number using an input mean, e.g. a keypad. For the gospel of John chapter 3, 2-04-003 is entered. The controller will interpret this number based on the 6-digit numerical indexing system, and search in the memory. First, it would go into root folder "2", then it would go into the subfolder "04" to find the audio file named "003". Finally, it would control the output means, e.g speaker, or earphone, to play out the sound of the audio file.

This audio bible player can also load and play multiple bible versions. For example, suppose that it is preloaded with English Standard Version (ESV) Old Testament and New Testament, and King James Version (KJV) Old Testament and New Testament. In the memory root directory, there would be four different folders.

Folder "1" is for ESV Old Testament
Folder "2" is for ESV New Testament
Folder "3" is for KJV Old Testament
Folder "4" is for KJV New Testament For John chapter 3, the numerical index would be 2-04-003 for the ESV version, and 4-04-003 for KJV version. The difference is only the first digit, making it very easy for a user to remember and to switch from one version to the same chapter of another version. Or, using an input means, e.g. a special "version/translation change" key, a user can send a command to the controller to change bible version. After receiving this command, the controller would automatically find and play the same chapter of a different bible version. If there are more than two versions loaded, it would switch to the same chapter of the next available version if the user presses this key again. This is a very convenient multiple bible version playback function.

The Audio bible player is also programmed to remember the last position it played. So, whenever the play is turned off and turned on again, it would start playing automatically from where it was turned off.

Alternative Embodiments

Figure 9:
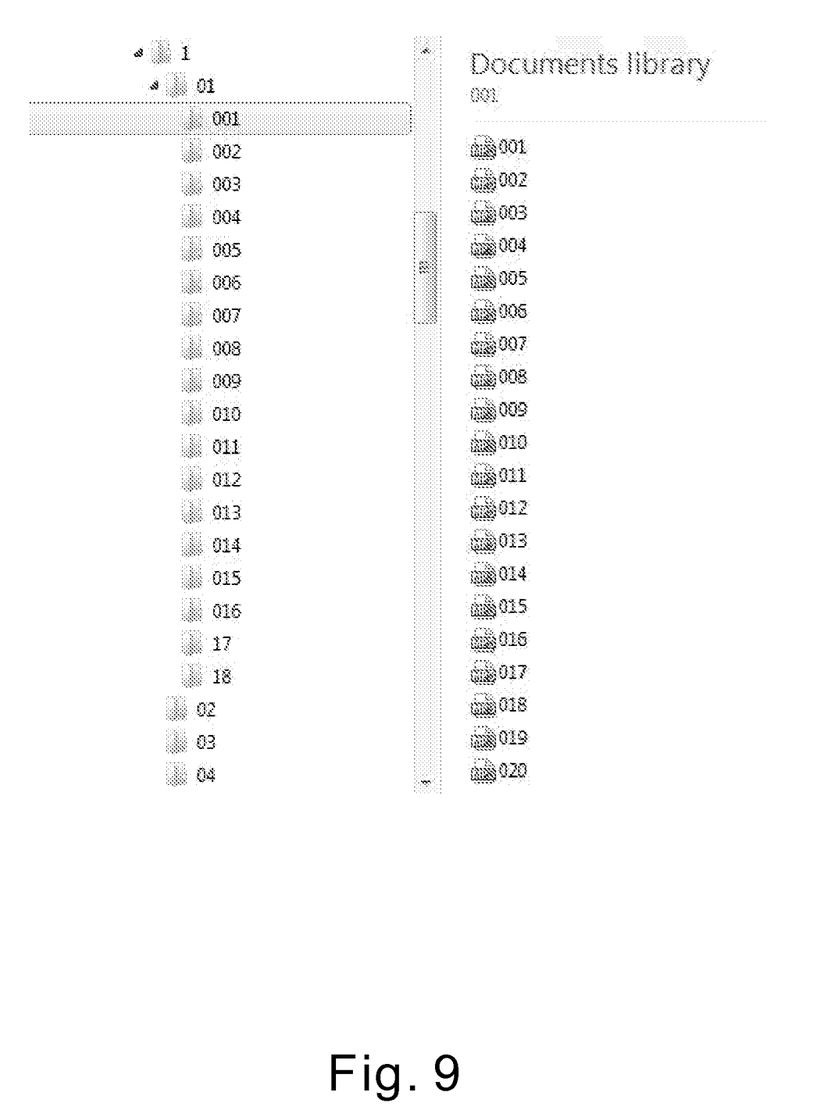
FIG. 9: An illustration of one file system embodiment for the 9-digit indexing system

1. Another alternative embodiment is shown in FIG. 7. A user can use the number keys to enter the 6-digit numerical index of a chosen chapter, and then press No 33 to start playing. There are two supplement book navigation keys, 26 and 28, that enable a user to move from book to book back and forth in a sequential order. There are also two supplement chapter navigation keys, 20 and 32, that enable a user to move from chapter to chapter back and forth in a sequential order. When the 6-digit numerical indexing system is combined with book/chapter navigation keys, it offers a user more flexibility to find a chapter of the bible. The navigation keys are very important for those who are not familiar with the numerical indexing system initially. If a user cannot remember the exact numerical numbers and only know approximately what they are, he/she can enter a number based on his/her best knowledge, and then use these navigation keys to make adjustment to find the exact chapter he/she is looking for.
2. Another alternative embodiment uses a 9-digit numerical indexing system, a-bb-ccc-ddd, that is able to go to the verse level. While the first six numbers are the same as the 6-digit indexing system, the last three numbers ddd will represent verse number. To support this 9-digit numerical indexing system, the file structure of FIG. 6 can be modified into that of FIG. 9. The audio recording of each verse is stored into a file with the file name the same as the verse number, while all verse audio files of the same chapter are stored under one sub folder with the folder name the same as the chapter number. Audio bible players with the 9-digit numerical indexing system can claim the full benefit of being able to play multiple translations/versions.
3. Another alternative is to modify the player to display bible text in synchronized with playing the bible audio. Users can read a verse on the display while listening to the same verse.
4. Another alternative is to add clock and alarm functions to the player. For the alarm, it would allow a user to store a numerical index of his/her preferred chapter, e.g. a Psalm 23, when setting up the alarm. So, the user can be woke up by his/her preferred bible chapter.
5. Another alternative is a 6-digit or 9-digit audio bible player for Catholic bibles. The numerical indexing system used above is based on standard Christian Bible book orders. Since there are additional books in the Catholic bibles, the book numbers would be different. But we can use the same principle to create numerical indexes based on the natural book order of Catholic bibles.
6. Another alternative is to use the 6-digit or 9-digit indexing system for an electronic text bible to reach a chapter text or a verse text quickly

Alternative Uses

1. Alternatively, the audio bible player can be used to play other audio files, e.g. music, preaching messages. The user just needs to load audio files into different folders and assign numerical indexes that are consistent with their folder locations and file names.
2. Alternatively, the audio bible player can also be used as a language study tool. The user can load the same reading of different languages. When the "Bible version change key" is pressed, it would switch to different languages for comparison. When text of the reading is displayed that is synchronized with the audio play, a user can read while listening.

CONCLUSIONS AND SCOPE

Audio bible players with a 6-digit numerical indexing system to the bible chapter level or a 9-digit numerical indexing system to the bible verse level are disclosed. Users can not only find a particular chapter or verse of the bible quickly, but also can switch to the same chapter or verse of a different translation easily for comparison study. They are easy and convenient to use, and are great tools for bible study, bible memorization, language study, and sharing bible with people in other languages, etc.

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

The invention claimed is:
1. A Christian audio bible player, comprising:
a memory which stores all audio bible files;
a 6-digit numerical indexing system, in which a first digit of said 6-digit numerical indexing system represents old testament or new testament, a second digit and a third digit of said 6-digit numerical indexing system represent a book number, and last three digits of said 6-digit numerical indexing system represent a chapter number;
a controller which interprets the 6-digit numerical indexing system for old/new testament, each book, and each chapter of the Christian audio bible;
a numeric keypad and a backspace key, wherein a human operator uses the numeric keypad and the backspace key to select old/new testament, a book, and a chapter by inputting said first digit, said second digit, said third digit and said last three digits of a bible chapter;
a speaker or an earphone which plays out sounds from the audio files; and
a power on/off switch that turns on or off the power for the audio bible player;
wherein said controller receives said first digit, said second digit, said third digit and said last three digits from said keypad, and interprets said first digit, said second digit, said third digit and said last three digits according to said 6-digit numerical indexing system to find a corresponding audio bible chapter file, and controls said speaker or said earphone to play out sound from the audio bible chapter file.
2. The audio bible player of claim 1, further comprising two bible book navigation keys that enable a user to move from book to book back and forth in a sequential order, and two chapter navigation keys that enable a user to move from chapter to chapter back and forth in a sequential order.
3. The audio bible player of claim 1, wherein said memory further stores bible text files in a similar way as audio files, and said controller controls a display to display bible text that is synchronized with the audio bible being played.
4. The audio bible player of claim 1, wherein the audio bible player is turned off, said controller is programmed to remember a last position it played, said audio bible player is turned on again, and said controller is programmed to start playing automatically from said last position.

5. The audio bible player of claim 1, further comprising a clock time display and an alarm,
   wherein a user enters both an alarm time and a numerical index of a bible chapter to set up the alarm, and said controller stores the alarm time and the numerical index in the memory, and
   wherein said controller finds the corresponding audio bible file based on the stored numerical index, controls said output speaker or said earphone to play out the sound of the audio file, so the user is woken up at the alarm time by the bible chapter the user entered in setting up the alarm.

6. A Christian audio bible player with a 9-digit numerical indexing system, comprising:
   a memory which stores all audio bible files;
   a 9-digit numerical indexing system for each verse of the Christian audio bible, in which a first digit of said 9-digit numerical indexing system represents old testament or new testament, a second digit and a third digit of said 9-digit numerical indexing system represent a book number, a fourth digit, a fifth digit and a sixth digit of said 9-digit numerical indexing system represent a chapter number, and last three digits of said 9-digit numerical indexing system represent a verse number;
   a controller which interprets the 9-digit numerical indexing system;
   a numeric keypad and a backspace key, wherein a human operator uses the numeric keypad and the backspace key to select old/new testament, a book, a chapter, and a verse by inputting said first digit, said second digit, said third digit, said fourth digit, said fifth digit, said sixth digit, and said last three digits;
   a speaker or an earphone which plays out sounds from the audio files; and
   a power on/off switch that turns on or off the power for the audio bible player;
   wherein said controller receives said first digit, said second digit, said third digit, said fourth digit, said fifth digit, said sixth digit, and said last three digits from said keypad, and interprets said first digit, said second digit, said third digit, said fourth digit, said fifth digit, said sixth digit, and said last three digits according to said 9-digit numerical indexing system to find a corresponding audio bible verse file, and controls said speaker or said earphone to play out sound from the audio bible verse file.

7. The audio bible player of claim 6, further comprising two bible book navigation keys that enable a user to move from book to book back and forth in a sequential order, two chapter navigation keys that enable a user to move from chapter to chapter back and forth in a sequential order, and two verse navigation keys that enable a user to move from verse to verse back and forth in a sequential order.

8. The audio bible player of claim 6, wherein said memory further stores bible text files in a similar way as audio files, and said controller controls a display to display bible text that is synchronized with the audio bible being played.

9. The audio bible player of claim 6, wherein the audio bible player is turned off, said controller is programmed to remember a last position it played, said audio bible player is turned on again, and said controller is programmed to start playing automatically from said last position.

10. The audio bible player of claim 6, further comprising a clock time display and an alarm,
   wherein a user enters both an alarm time and said numerical index of a bible verse to set up the alarm, and said controller stores the alarm time and the numerical index in the memory, and
   wherein said controller finds the corresponding audio bible file based on the stored numerical index, controls said output speaker or said earphone to play out the sound of the audio file, so the user is woken up at the alarm time by the bible verse the user entered in setting up the alarm.

11. A Catholic audio bible player comprising:
   a memory stores all audio bible files;
   a 6-digit numerical indexing system for each chapter of the Catholic audio bible, in which a first digit of said 6-digit numerical indexing system represents Catholic bible old testament or new testament, a second digit and a third digit of said 6-digit numerical indexing system represent a Catholic bible book number, and last three digits of said 6-digit numerical indexing system represent a chapter number; or a 9-digit numerical indexing system for each verse of the Catholic audio bible, in which a first digit of said 9-digit numerical indexing system represents old testament or new testament, a second digit and a third digit of said 9-digit numerical indexing system represent a book number, a fourth digit, a fifth digit and a sixth digit of said 9-digit numerical indexing system represent a chapter number, and last three digits of said 9-digit numerical indexing system represent a verse number;
   a controller which interprets the 6-digit or the 9-digit numerical indexing system;
   a numeric keypad and a backspace key, wherein a human operator uses the numeric keypad and the backspace key to select old/new testament, a book, and a chapter by inputting said first digit, said second digit, said third digit and said last three digits of said 6-digit numerical indexing system for a bible chapter; or to select old/new testament, a book, a chapter, and a verse by inputting said first digit, said second digit, said third digit, said fourth digit, said fifth digit, said sixth digit, and said last three digits of said 9-digit numerical indexing system for a bible verse;
   a speaker or an earphone which plays out sounds from the audio files; and
   a power on/off switch that turns on or off the power for the audio bible player;
   wherein said controller receives said first digit, said second digit, said third digit and said last three digits of said 6-digit numerical indexing system from said keypad, and interprets said first digit, said second digit, said third digit and said last three digits according to said 6-digit numerical indexing system to find a corresponding audio bible chapter file, and controls said speaker or said earphone to play out sound from the audio bible chapter file, or wherein said controller receives said first digit, said second digit, said third digit, said fourth digit, said fifth digit, said sixth digit, and said last three digits from said keypad, and interprets said first digit, said second digit, said third digit, said fourth digit, said fifth digit, said sixth digit, and said last three digits according to said 9-digit numerical indexing system to find a corresponding audio bible verse file, and controls said speaker or said earphone to play out sound from the audio bible verse file.

12. The audio bible player of claim 1, wherein the memory stores all audio bible files of multiple bible translations, further comprising a key for a human operator to input a bible translation change command, wherein said controller receives said bible translation change command, and finds the audio bible file of the same chapter of a different translation, and controls said speaker or said earphone to play out sound from the audio bible chapter file.

13. The audio bible player of claim 6, wherein the memory stores all audio bible files of multiple bible translations, further comprising a key for a human operator to input a bible translation change command, wherein said controller receives said bible translation change command, and finds the audio bible file of the same verse of a different translation, and controls said speaker or said earphone to play out sound from the audio bible verse file.

14. The audio bible player of claim 11, wherein the memory stores all audio bible files of multiple Catholic bible translations, further comprising a key for a human operator to input a bible translation change command, wherein said controller receives said bible translation change command, and finds the audio bible file of the same chapter of a different translation for said 6-digit numerical indexing system, and controls said speaker or said earphone to play out sound from the audio bible chapter file; or wherein said controller receives said bible translation change command, and finds the audio bible file of the same verse of a different translation for said 9-digit numerical indexing system, and controls said speaker or said earphone to play out sound from the audio bible verse file.

* * * * *